US006243384B1

(12) United States Patent
Eriksson et al.

(10) Patent No.: US 6,243,384 B1
(45) Date of Patent: Jun. 5, 2001

(54) ADDRESS ANALYSIS FOR ASYNCHRONOUS TRANSFER MODE NODE WITH PNNI PROTOCOL

(75) Inventors: Anna Eriksson, Saltsjo-boo; Ove Pettersson, Stockholm, both of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/045,540

(22) Filed: Mar. 23, 1998

(51) Int. Cl.[7] .......................... H04L 12/28; G06F 15/173
(52) U.S. Cl. ........................... 370/395; 709/238; 370/389
(58) Field of Search ................................... 370/395, 392, 370/397, 398, 399, 400, 401, 402, 408, 409, 252, 254, 229–237, 389, 429, 368, 374, 378, 371; 709/220, 221, 222, 223, 224; 710/38

(56) References Cited

U.S. PATENT DOCUMENTS 4,920,529   4/1990   Sasaki et al. ..

FOREIGN PATENT DOCUMENTS

| 0 552 385 A1 | 7/1993 | (EP) . |
| 0 773 649 A2 | 5/1997 | (EP) . |
| 2 284 730 | 6/1995 | (GB) . |
| 96 21985 | 7/1996 | (WO) . |

OTHER PUBLICATIONS

Black, "ATM Vol. II Signaling in Broadband Networks", Prentice Hall PTR, 1998, XP002080340, New Jersey, pp. 159–179.

Garcia–Luna–Aceves, "Libra: A Distributed Routing Algorithm for Large Internets", Communication for Global Users, Orlando, Dec. 6–9, 1992, vol. 3, Dec. 6, 1992, XP000390448, Institute of Electrical and Electronics Engineers, pp. 1465–1471.

Kaliszewski, "Routing Algorithm and Route Optimization on SITA Data Transport Network", Global Telecommunications Conference, San Diego, Nov. 28–Dec. 1, 1983, vol. 2, No. CONF. 1983, Nov. 28, 1983, XP0002034842, Institute of Electrical and Electronics Engineers, pp. 892–897.

Awerbuch et al, "Communication–Optimal Maintenance of Replicated Information", Proceedings of the Annual Symposium on Foundations of Computer Scie, St. Louis, Oct. 22–24, 1990, vol. 2, No. SYMP. 31, Oct. 22, 1990, XP000221958, Institute of Electrical and Electronics Engineers, pp. 492–502.

The ATM Forum Technical Committee, Private Network–Network Interface Specification Version 1.0 (PNNI 1.0), af–pnni–0055.000, Mar. 1996.

The ATM Forum Slide Presentation, Complete Long–Term Solution: PNNI Phase 1, ATM PNNImod 1.0–9 A, 1996.

*Primary Examiner*—Wellington Chin
*Assistant Examiner*—Steven Nguyen
(74) *Attorney, Agent, or Firm*—Nixon & Vanderhye, P.C.

(57) ABSTRACT

An ATM switching node (20) which implements PNNI protocol has a table (known as the consolidated table) which stores plural records, each record associating a connection request input field with corresponding routing information. The node has table maintenance logic (78) which updates the table to consolidate therein both records initiated by operator input and records developed from PNNI updating information. The PNNI updating information is generated by a PNNI protocol unit (56) which consults a topology database of the node. Provision of the consolidate table obviates consultation of multiple tables.

20 Claims, 9 Drawing Sheets

| Address Analysis Section 82 | | Routing Analysis Section 84 | | Local Look-Up Section 86 | |
|---|---|---|---|---|---|
| input field | Results Field | input field | Results Field | input | Results Field |
| 7191 | TE | RC-1 | UNIRoute 1<br>PNNIA.1.3<br>PNNIA.2 | 7191<br>112 | port ID of port connected to user having address 7191112 |
| 55 | RC-1 | RC-2 | B-ICIRoute1<br>PNNIA.1.2<br>PNNIA.2 | | |
| 727 | RC-2 | RC-3 | PNNIA.2 | | |
| 400 | RC-3 | | | | |

ADDRESS ANALYSIS FOR ASYNCHRONOUS TRANSFER MODE NODE WITH PNNI PROTOCOL

BACKGROUND

1. Field of the Invention

The present invention pertains to communications systems, and particularly to communications systems which employ ATM technology.

2. Related Art and other Considerations

Asynchronous Transfer Mode (ATM) is becoming increasingly used in communication networks. ATM is a packet-oriented transfer mode which uses asynchronous time division multiplexing techniques. Packets are called cells and have a fixed size.

An ATM cell consists of 53 octets, five of which form a header and forty eight of which constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual path is a principal path defined between two switching nodes of the network; the virtual channel is one specific connection on the respective principal path.

Between termination points of an ATM network a plurality of nodes are typically situated, such as switching nodes having ports which are connected together by physical transmission paths or links. The switching nodes each typically have several functional parts, a primary of which is a switch core. The switch core essentially functions like a cross-connect between ports of the switch. Paths internal to the switch core are selectively controlled so that particular ports of the switch are connected together to allow a cells ultimately to travel from an ingress side of the switch to an egress side of the switch.

A particular protocol, known as "PNNI", has been developed for use between private ATM switches, and between groups of private ATM switches. Consistent with these two potential employments, "PNNI" stands for either Private Network Node Interface, or Private Network-to-Network Interface. Thus, PNNI is a routing information protocol that enables multi-vendor ATM switches to be integrated in the same network. The PNNI protocol is defined e.g., by The ATM Forum's *Private Network_Network Interface Specification Version* 1.0 (PNNI 1.0), af-pnni-0055.000 (March 1996).

Each private ATM switch can be referred to as a (lowest level) node, each node having particular identifiers. Two nodes are connected together by a physical link, and many such nodes may be connected together. In PNNI parlance, nodes can be grouped together to form "peer groups". Each node exchanges certain identifying packets (e.g., "Hello" packets) with its immediate neighbors, so that each node can determine certain state information. The state information includes the identity and peer group membership of the node's immediate neighbors, and the status of the node's links to its neighbors. Each node uses the state information to prepare "PNNI Topology State Elements" (PTSEs) [henceforth also referred to as "topology messages"]. Nodes belonging to the same peer group exchange information with one another in a process known as "flooding", so that all nodes of the peer group have an identical view of the peer group.

Using the topology messages that it receives, each node builds its own topology database. The topology database essentially constitutes the node's view of the universe, e.g., the other nodes in its peer group, connections to other peer groups, and connections to private and public networks. Topology messages are sent in reoccurring fashion from each node, so that on the basis of PNNI information the topology database of each node is frequently updated by the relatively automatic flooding of topology messages. U.S. Pat. No. 4,920,529 to Sasaki et al. discloses e.g., a mode of reconfiguring databases wherein network reconfiguration information is switched from a preparatory side to an operating side for usage.

The concept of peer groups and a hierarchical structuring of node levels obviates requiring that a node's topology database have a comprehensive and detailed mapping of all lower level nodes of the entire system. Rather, in most instances the topology database of a node need only refer to the topology of the peer group to which it belongs, along with information regarding higher level nodes for the rest of the system.

The topology database of a node is important in view of the fact that PNNI uses source routing for all connection setup requests. In this regard, when a user requests a connection setup, an originating node (i.e., the first switching node encountered) chooses a general path to the destination, the general path being specified in accordance with the detail of the hierarchy known to the originating node. The path can be chosen using a path selection algorithm, which may vary from node to node. The path selection algorithm uses the information stored in the topology database in order to choose the general path to the destination, as well as other factors such as the connection's service category, traffic characteristics, and quality of services requirements, for example. The path is encoded as a Designated Transit List (DTL), which is included in the connection setup request. The path specifies every node to be used in transit across the peer group to which the originating node belongs, and refers to higher level nodes which are to be used in reaching the destination. When the connection setup request reaches another node level, e.g., another peer group, the ingress node of the newly reached peer group selects the particular path across the newly reached peer group, consistent with the general path chosen by the originating node (unless a problem occurs).

As indicated above, at each node a path selection algorithm, utilizing the topology database, can choose a path. In addition, it is also possible for an operator, e.g., via manual input, to define the routing [e.g., specify the path(s)] for a user. In the ease of operator definition, the operator-input routing information is stored in a separate table. Thus, heretofore in at least some instances the routing selection function of the node must consult two independent sources of information—the topology database and the separate table in which the operator-input routing information is stored.

BRIEF SUMMARY OF THE INVENTION

An ATM switching node which implements PNNI protocol has a table (known as the consolidated table) which stores plural records, each record associating a connection request input field with corresponding routing information. The node has table maintenance logic which updates the table to consolidate therein both records initiated by operator input and records developed from PNNI updating information. The PNNI updating information is generated by a PNNI protocol unit which consults a topology database of the node. Provision of the consolidate table obviates consultation of multiple tables.

When a connection request is received at the node, a call control unit of the node sends a called party number included in the connection request to a table handling unit. The table handling unit uses the at least a portion of the called party number as the connection request input field for locating the corresponding routing information in the consolidated table.

The consolidated table has an address analysis section; a routing analysis section; and a local look-up section. The consolidated table has an active version and an inactive version copied therefrom. The active version of the consolidated table is utilized in connection setup. Updating is performed on the inactive version of the consolidated table. When updating is completed, the inactive version of the consolidated table becomes the active version of the consolidated table.

The node also includes a static table in which operator input information is stored for use in developing the records initiated by operator input. The operator input information stored in the static table and the PNNI updating information are merged in the inactive version of the consolidated table during table updating.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2 is a diagrammatic view of an example consolidated table employed for address handling by the node of FIG. 1.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
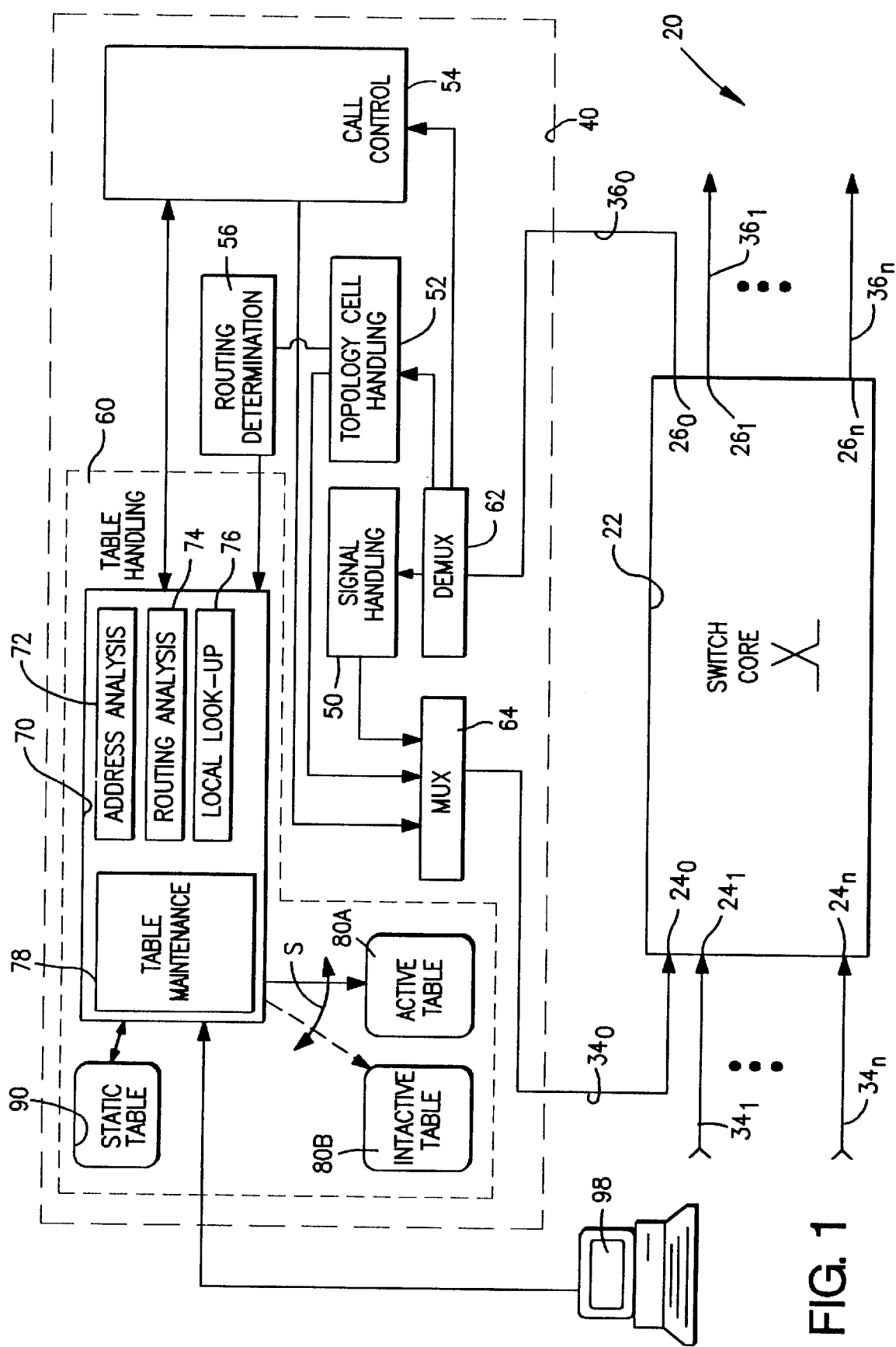
FIG. 1 is a schematic view of an ATM switching node according to an embodiment of the invention.

FIG. 1 shows an ATM switching node 20 according to an embodiment of the invention and which employs PNNI protocol. ATM switching node 20 includes a switch fabric or switch core 22 having core ports $24_0$–$24_n$ which receive ATM cells, and core ports $26_0$–$26_n$ from which ATM cells leave switch core 22. In the illustrated embodiment, ports $24_1$–$24_n$ are connected by physical links $34_1$–$34_n$ to other ATM nodes; ports $26_1$–$26_n$ are connected by physical links $36_1$–$36_n$ to other ATM nodes. Although not shown, it should be understood that one or more circuit boards may be connected between a core port and a physical link for various purposes, for example the handling ingress or egress ATM cells as the case may be, particularly for buffering and conversion between external and switch-internal VPI/VCI assignments.

In addition to switch core 22, ATM switching node 20 includes a node control system 40 which supervises operation of ATM switching node 20 and which performs PNNI-related operations including source routing. In the particular embodiment shown in FIG. 1, node control system 40 is situated on a circuit board which is connected to send ATM cells via physical link $34_0$ to switch core 22 (i.e., to core port $24_0$) and to obtain ATM cells from switch core 22 (i.e., core port $26_0$) via physical link $36_0$. Although shown as occupying only one board in the illustrated embodiment, it should be understood that in other embodiments the functions of node control system 40 can be distributed as desired among plural circuit boards and therefore addressable through plural ports of switch core 22.

Node control system 40 includes numerous functional units, of which illustrated are signal cell handling unit 50; topology cell handling unit 52; call control unit 54; routing determination (PNNIR) unit 56; and, table handling unit 60. In addition, node control system 40 includes a demultiplexer unit 62 and a multiplexer unit 64. Demultiplexer unit 62 analyzes the types of ATM cells directed to node control system 40 from switch core 22, and forwards the cells to appropriate units such as (for example) signal handling unit 50, topology cell handling unit 52, and call control unit 54. Multiplexer unit 64 obtains output ATM cells from various source units (e.g., signal handling unit 50, topology cell handling unit 52, and call control unit 54), and forwards those output ATM cells on physical link $34_0$ to switch core 22 so that the cells can be routed as appropriate, e.g., to another node.

As call control unit 54 performs connection setup, an address value representative of the called party is forwarded to table handling unit 60 from call control unit 54. The table handling unit 60 includes a table handling processor 70. Table handling processor 70 in turn includes address analysis logic 72, routing analysis logic 74; local look-up logic 76; and table maintenance logic 78. Table handling unit 60 further includes a table known as the consolidated table, of which there is both an active version (shown as table 80A in the drawings) and an inactive version (shown as table 80B in then drawings). At any given time, one of the tables 80A, 80B is designated as the active table and the other is designated as the inactive table. Whichever one of the tables 80A, 80B is currently the active table (pointed to by the table selector S in FIG. 1) is referenced by various ones of the logical blocks of table handling processor 70 in connection with connection setup. The other of the tables 80A, 80B which is currently designated as inactive serves as a working area in which table maintenance logic 78 can prepare an updated table for subsequent use as the active table.

The functional units of node control system 40 can be implemented either by dedicated hardware or by one or more processors executing coded instructions. The tables of node control system 40 can be realized in on-board memory or external memory chips.

An example of a representative one of the tables 80A, 80B, generically referenced as table 80, is shown in FIG. 2. The example of table 80 shown in FIG. 2 is partitioned to have three sections corresponding to three logic blocks of table handling processor 70, particularly an address analysis section 82; routing analysis section 84; and local look-up section 86. Each section of table 80 has an input field and a corresponding result field. The format and usage of table 80 is subsequently explained in connection with source routing connection examples of FIG. 3A through FIG. 6A.

In addition to the consolidated tables 80A, 80B, table handling unit 60 has static table 90. Table 90 is said to be "static" in the sense that data stored therein is ultimately input from an operator and remains until subsequently changed by an operator. The data obtained from the operator and stored in static table 90 is typically of the same type as stored in consolidated tables 80A, 80B, e.g., address analysis data, routing data, and local lookup. In this regard, static table is likewise partitioned to have three sections, address analysis section 92; routing analysis section 94; and local look-up section 96 (see FIG. 7). In simplified manner, FIG. 1 shows a workstation 98 connected (e.g., via appropriate unillustrated interfaces) to table handling unit 60, so that the table maintenance logic 78 can add, delete, or edit records of data stored in static table 90. Workstation 98 can be a node element management system or a network management system, for example.

In contrast to the static data maintained in static table 90, address and routing data can also be dynamically provided to table handling unit 60 in view of the PNNI protocol implemented by ATM switching node 20. In this regard, topology cell handling unit 52 recurrently receives topology messages (e.g., PTSEs) in the form of ATM cells from other nodes in the same peer group with ATM switching node 20. The topology cell handling unit 52 builds the topology database of ATM switching node 20. The routing determination unit 56, which functions as the PNNI protocol unit (PNNIR) implements the node's path selection algorithm based on the information stored in the topology database. Routes or paths determined by the path selection algorithm of routing determination unit 56 are forwarded to table maintenance logic 78 of table handling processor 70 for use in an appropriate results field of routing analysis section 84 of the consolidated table 80.

Call control unit 54 performs call control for calls and invokes address analysis logic 72, routing analysis logic 74, and local look-up logic 76 of table handling processor 70.

FIG. 3A, FIG. 4A, FIG. 5A, and FIG. 6A show situating of node 20, also known as node A.1.1, in an ATM system 100. So situated, node 20, along with nodes A. 1.2, A.1.3, and A.1.4 belong to peer group A.1. ATM system 100 also has peer group A.2, which comprises nodes A.2.1 and A.2.2. The ATM system 100 is connected by B-ISDN links to public network 110, and to private network 120.

Figure 3A:
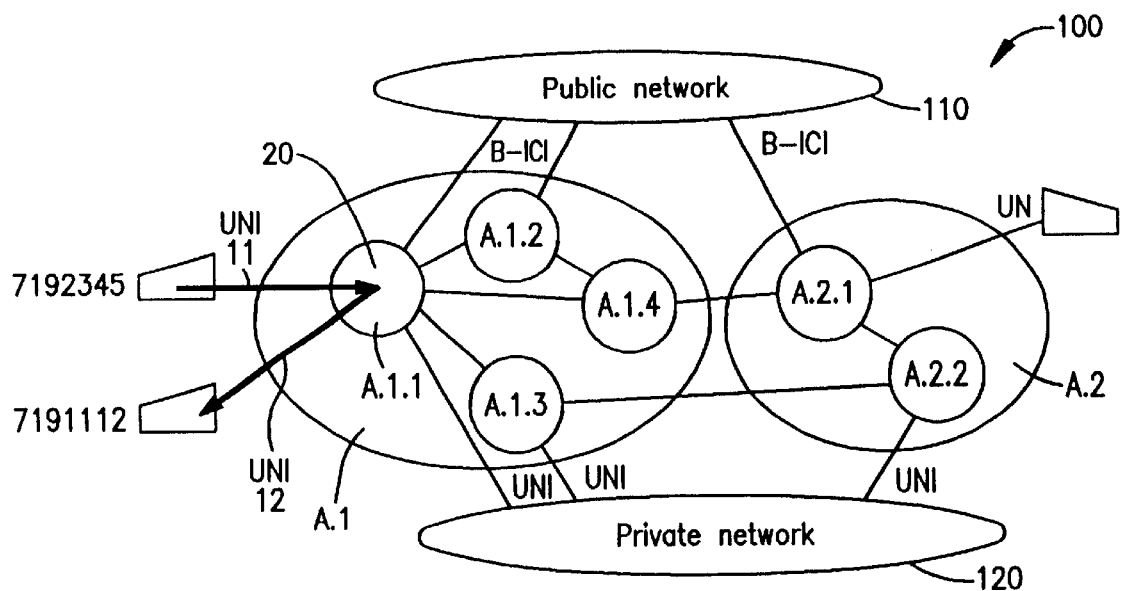
FIG. 3A is a schematic view of an ATM network system which illustrates a first traffic case involving the node of FIG. 1.
Figure 3B:
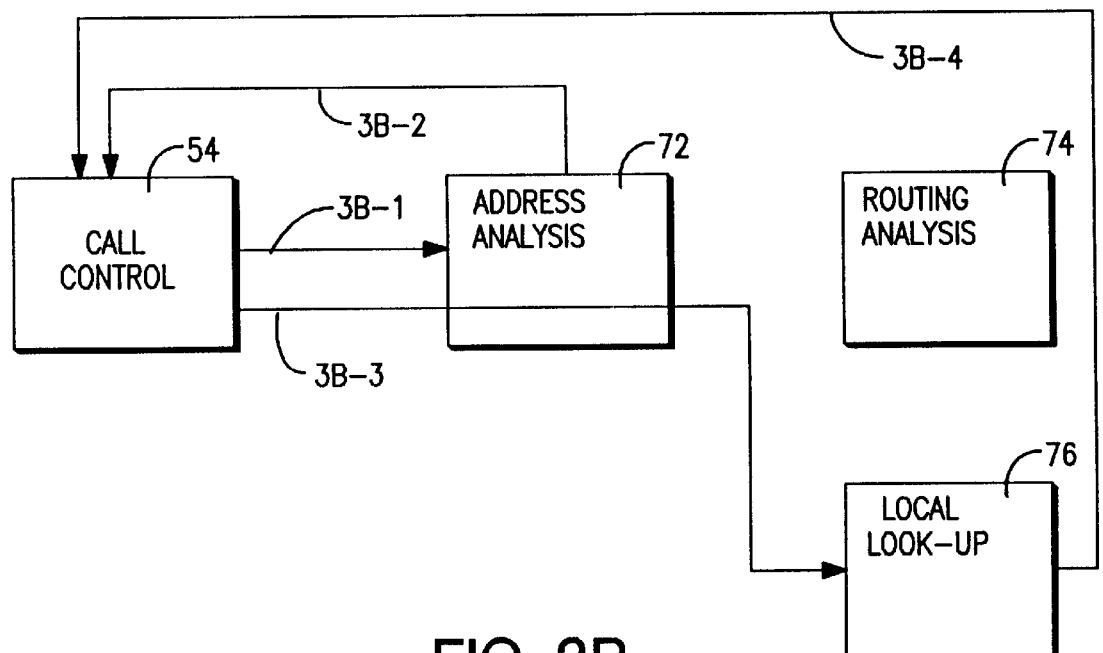
FIG. 3B is a diagrammatic view depicting messages between a call control unit and logical blocks of a message handling unit when implementing the traffic case of FIG. 3A.

FIG. 3A together with FIG. 3B illustrate a first scenario of address handling at node 20 upon connection setup, while second, third, and fourth scenarios are illustrated by the respective pairings of FIG. 4A and FIG. 4B, FIG. 5A and FIG. 5B, and FIG. 6A and FIG. 6B. In these paired figure illustrations, FIG. 3A, FIG. 4A, FIG. 5A, and FIG. 6A depict the network topology used for the example illustrations, while FIG. 3B, FIG. 4B, FIG. 5B, and FIG. 6B show the interaction of call control unit 54 with the various logic blocks of table handling unit 60, particularly with address analysis logic 72, routing analysis logic 74, and local look-up logic 76.

FIG. 3A together with FIG. 3B show a first traffic case in which node 20 is involved in connection setup for a connection between two users, both of whom are connected directly (i.e., not through a transit switch) to node 20. In the case of FIG. 3A, the call is placed by a user having an address 7192345 to a user having the address 7191112. The user with address 7192345 is connected to node 20 over user-to-network interface UNI 11; the user with address 7191112 is connected to node 20 over user-to-network interface UNI 12. The traffic case of FIG. 3A is from an originating UNI to a terminating UNI.

FIG. 3B shows a connection request message 3B-1 from user having address 7192345 to node 20, the connection request message 3B-1 including the called party number (e.g., address 7191112) of the called party. Upon receipt of the connection request message 3B-1, call control unit 54 sends the address 7191112 to address analysis logic 72 of table handling processor 70. The address analysis logic 72 locates in address analysis section 82 of the active consolidated table a record which has the address 7191 as an input value. As shown in the example table of FIG. 2, the first record of address analysis section 82 has such value, along with a paired result value of "TE". The result value "TE" indicative of a terminating case is returned by address analysis logic 72 to call control unit 54 as indicated by message 3B-2. Upon receipt of the terminating case result value "TE", call control unit 54 sends a lookup message 3B-3 (including the address 7191112) to local look-up logic 76. The local look-up logic 76 consults local look-up section 86 of table 80 (see FIG. 2), and returns a port Id message 3B-4 having a value which identifies the particular port(s) of core 22 (port ID) which is connected to the user having the address 7191112.

As used herein, the term "record" is intended to refer to any association of an input value (in the form of at least a portion of a called party address) and a result value, in which the input value is used to locate a corresponding result value. Thus, the term "record" is not confined to any particular format, or manner or medium of storage.

Figure 4A:
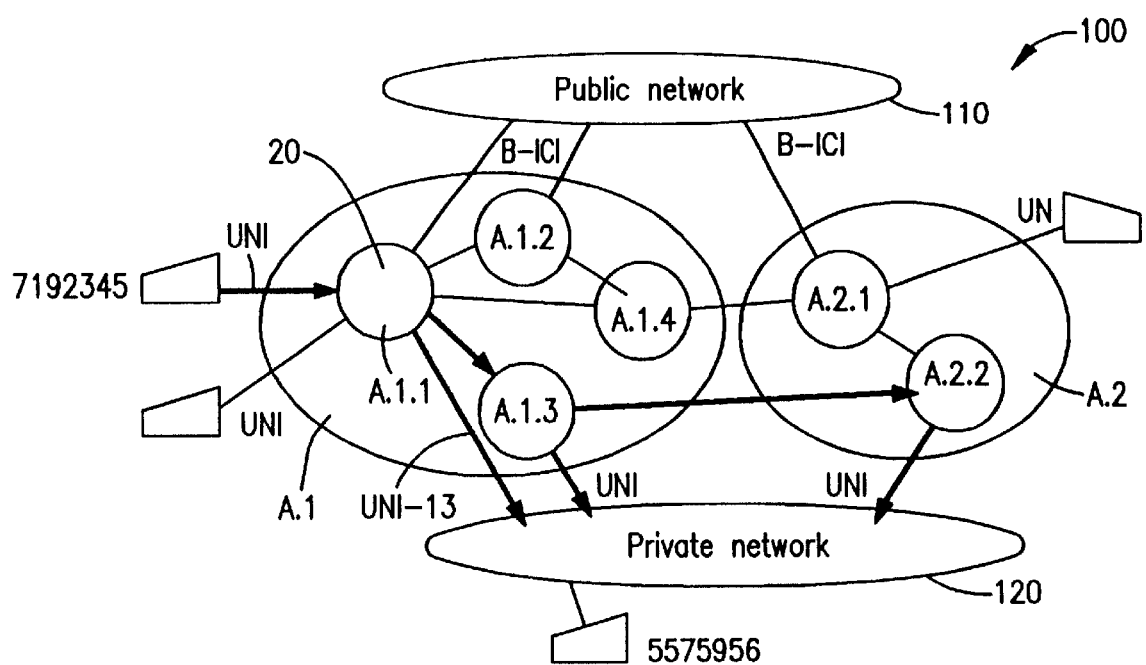
FIG. 4A is a schematic view of an ATM network system which illustrates a second traffic case involving the node of FIG. 1.
Figure 4B:
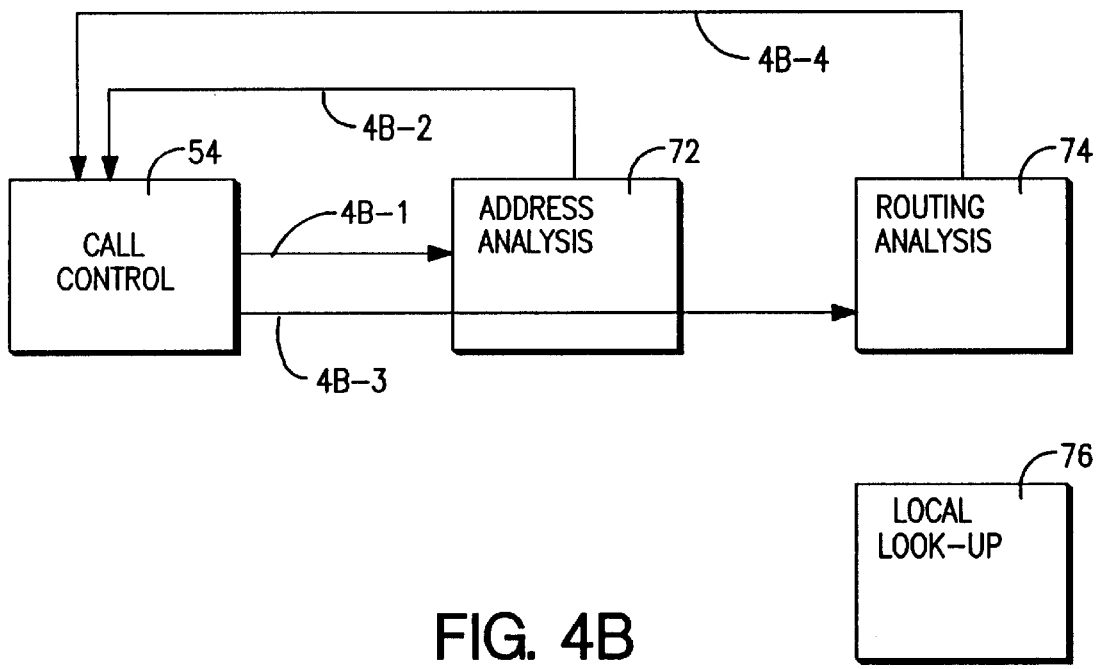
FIG. 4B is a diagrammatic view depicting messages between a call control unit and logical blocks of a message handling unit when implementing the traffic case of FIG. 4A.

FIG. 4A together with FIG. 4B show a second traffic case in which node 20 is involved in connection setup for a connection from the user having address 7192345

(connected by UNI 11 to node 20) to a user in private network 120 having address 5575956. FIG. 4B shows a connection request message 4B-1 from user having address 7192345 to node 20, the connection request message 4B-1 including the called party number (e.g., address 5575956) of the called party. Upon receipt of the connection request message 4B-1, call control unit 54 sends the address 5575956 to address analysis logic 72 of table handling processor 70. The address analysis logic 72 locates in address analysis section 82 of the active consolidated table a record which has the address 55 as an input value. As shown in the example table of FIG. 2, the second record of address analysis section 82 has such value, along with a paired result value of "RC-1". The result value "RC-1" indicative of a routing case is returned by address analysis logic 72 to call control unit 54 as indicated by message 4B-2. Upon receipt of the routing case result value "RC-1", call control unit 54 sends message 4B-3 (including the result value "RC-1") to routing logic 74. The routing logic 74 consults routing analysis section 84 of table 80 (see FIG. 2), and using RC-1 as an index returns a list of routes message 4B-4. The list of routes message 4B-4 includes the three routes or paths garnered from the second record of routing analysis section 84 of table 80, i.e., UNIRoute 1; PNNIA.1.3; and PNNIA.2. The first such route (UNIRoute 1) is over interface UNI 13 which connects node 20 to private network 120. The second route (PNNIA.1.3) is through node A.1.3 and a UNI connecting node A.1.3 to private network 120. The third route (PNNIA.2) is through peer group A.2 (via node A.1.3) and over a UNI connecting peer group A.2 to private network 120. the order of the routes/paths in the list of routes messages is indicative of the priority or preference. The particular priority specified in the results field is a result of operator input, since the priority between PNNI and UNI/BICI is set by the operator. The ultimate choice regarding priority is up to call control unit 54. Regardless of such choice, the traffic case of FIG. 4A is thus seen as being from an originating UNI to an outgoing UNI.

Figure 5A:
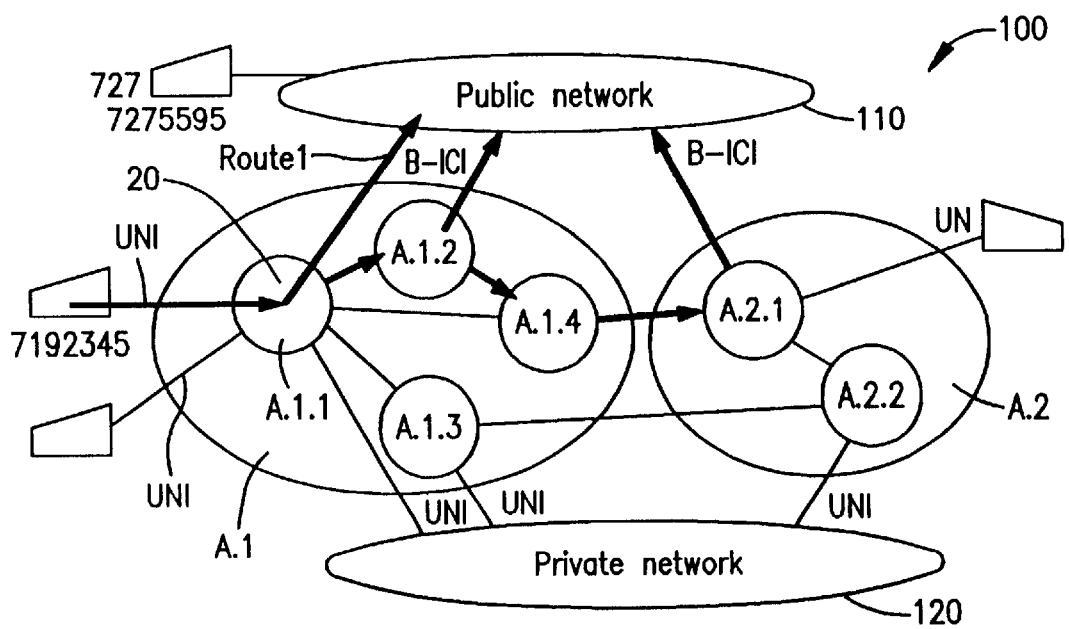
FIG. 5A is a schematic view of an ATM network system which illustrates a third traffic case involving the node of FIG. 1.
Figure 5B:
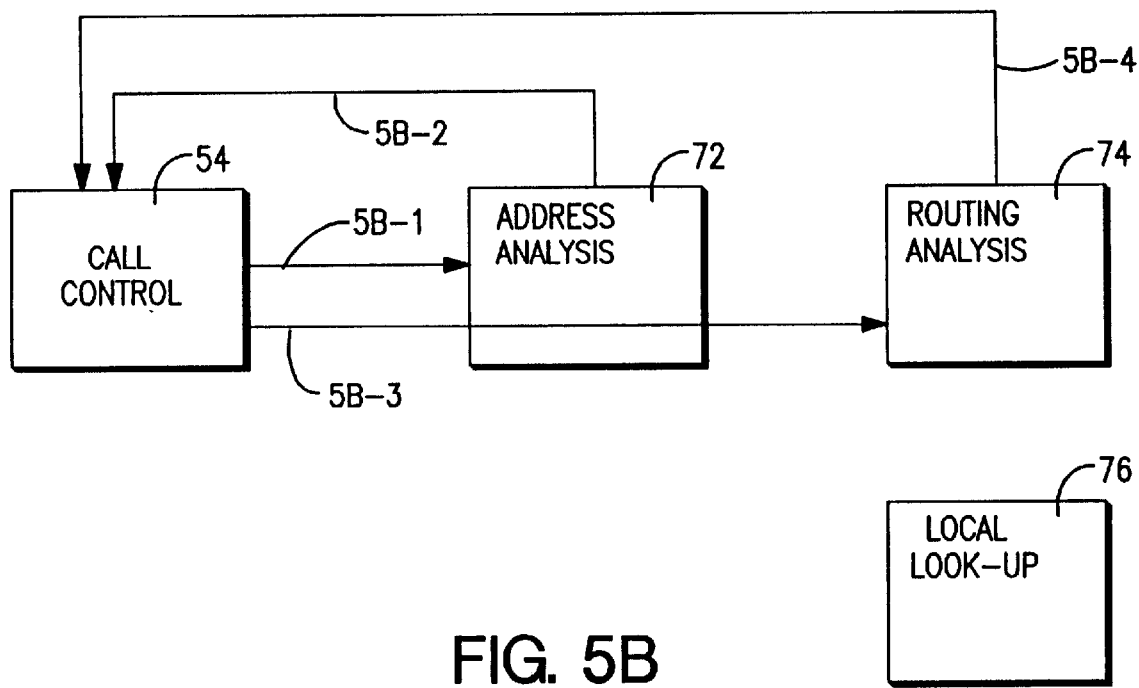
FIG. 5B is a diagrammatic view depicting messages between a call control unit and logical blocks of a message handling unit when implementing the traffic case of FIG. 5A.

FIG. 5A together with FIG. 5B show a third traffic case in which node 20 is involved in connection setup for a connection from the user having address 7192345 (connected by UNI 11 to node 20) to a user in public network 110 having address 7275595. FIG. 5B shows a connection request message 5B-1 from user having address 7192345 to node 20, the connection request message 5B-1 including the called party number (e.g., address 7275595) of the called party. Upon receipt of the connection request message 5B-1, call control unit 54 sends the address 7275595 to 72 of table handling processor 70. The address analysis logic 72 locates, in address analysis section 82 of the active consolidated table, a record which has the address 727 as an input value. As shown in the example table of FIG. 2, the third record of address analysis section 82 has such value, along with a paired result value of "RC-2". The result value "RC-2" indicative of a routing case is returned by address analysis logic 72 to call control unit 54 as indicated by message 5B-2. Upon receipt of the routing case result value "RC-2", call control unit 54 sends message 5B-3 (including the result value "RC-2") to routing logic 74. The routing logic 74 consults routing analysis section 84 of table 80 (see FIG. 2), and (using RC-2 as the input value) returns a list of routes message 5B-4. The list of routes message 5B-4 includes the three routes or paths garnered from the third record of routing analysis section 84 of table 80, i.e., B-ICIRoute1; PNNIA.1.2; and PNNIA.2. The first such route (B-ICIRoute 1) is over a B-ICI interface which connects node 20 to public network 110. The second route (PNNIA.1.2) is through node A.1.2 and a B-ICI interface connecting node A.1.2 to public network 110. The third route (PNNIA.2) is through peer group A.2 and over a B-ICI interface connecting peer group A.2 to public network 110. Again, the order of the routes/paths in the list of routes messages is indicative of the priority or preference, but the ultimate choice is up to call control unit 54.

Figure 6A:
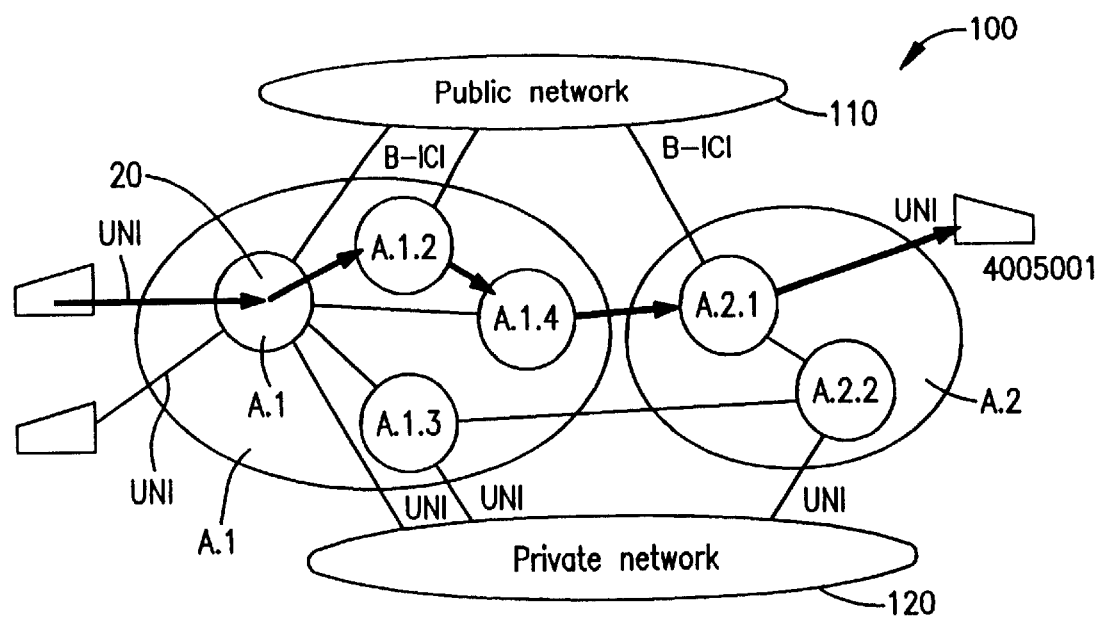
FIG. 6A is a schematic view of an ATM network system which illustrates a fourth traffic case involving the node of FIG. 1.
Figure 6B:
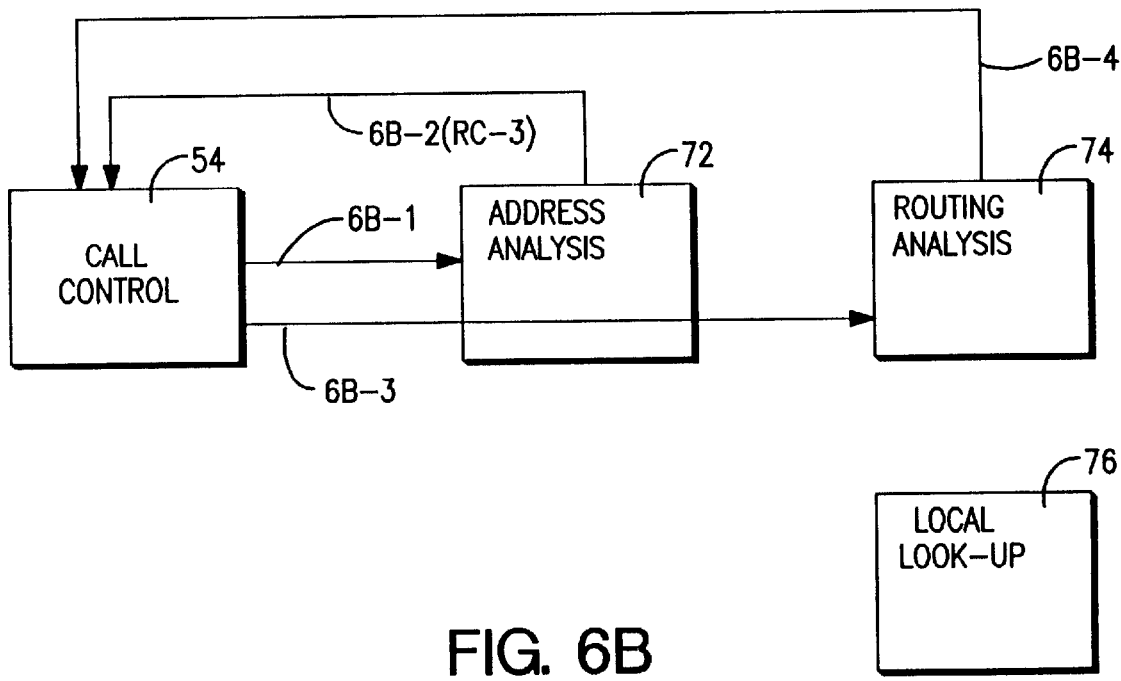
FIG. 6B is a diagrammatic view depicting messages between a call control unit and logical blocks of a message handling unit when implementing the traffic case of FIG. 6A.

FIG. 6A together with FIG. 6B show a fourth traffic case in which node 20 is involved in connection setup for a connection from the user having address 7192345 (connected by UNI 11 to node 20) to a user who is connected to node A.2.1 and who has an address 4005001. FIG. 6B shows a connection request message 6B-1 from user having address 7192345 to node 20, the connection request message 6B-1 including the called party number (e.g., address 4005001) ofthe called party. Upon receipt of the connection request message 6B-1, call control unit 54 sends the address 4005001 to address analysis logic 72 of table handling processor 70. The address analysis logic 72 locates, in address analysis section 82 of the active consolidated table, a record which has the address 400 as an input value. As shown in the example table of FIG. 2, the fourth record of address analysis section 82 has such value, along with a paired result value of "RC-3". The result value "RC-3" indicative of a routing case is returned by address analysis logic 72 to call control unit 54 as indicated by message 6B-2. Upon receipt of the routing case result value "RC-3", call control unit 54 sends message 6B-3 (including the result value "RC-3") to routing logic 74. The routing logic 74 consults routing analysis section 84 of table 80 (see FIG. 2), and (using RC-3 as the input value) returns a list of routes message 6B-4. The list of routes message 6B-4 includes the one route or path garnered from the fourth record of routing analysis section 84 of table 80, i.e., PNNIA.2. This route (PNNIA.2) is through peer group A.2 and over a UNI interface connecting peer group A.2 to the user having the address 4005001.

The present invention also allows for a routing test to be performed by an operator (e.g., via workstation 98). The routing test is accomplished without setting up any connection. In a routing test, an operator specifies an address which is to be tested, and also provides an indication of whether the operating side or the non-operating side is to be tested (e.g., whether the active or inactive one of the tables 80). The result returned by table handling unit 60 from a routing test can be either of the following depending on the circumstances: (1) a terminating case (TE) with a port Id; (2) a routing case with connected routes and nodes (the nodes are expanded to DTL lists): (3) a request for the operator to conduct a further analysis with new information; or (4) an error message.

Figure 7:
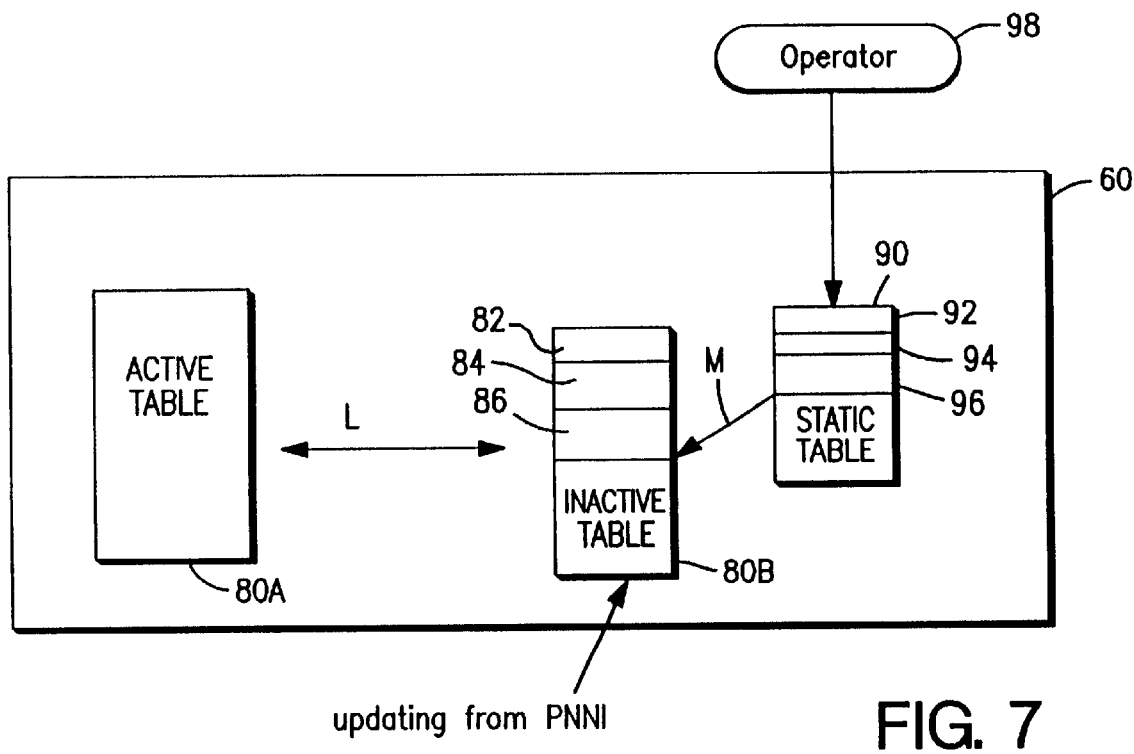
FIG. 7 is a diagrammatic view depicting updating of an active consolidated table by merging of contents of a static table and an inactive dynamic table.
Figure 10:
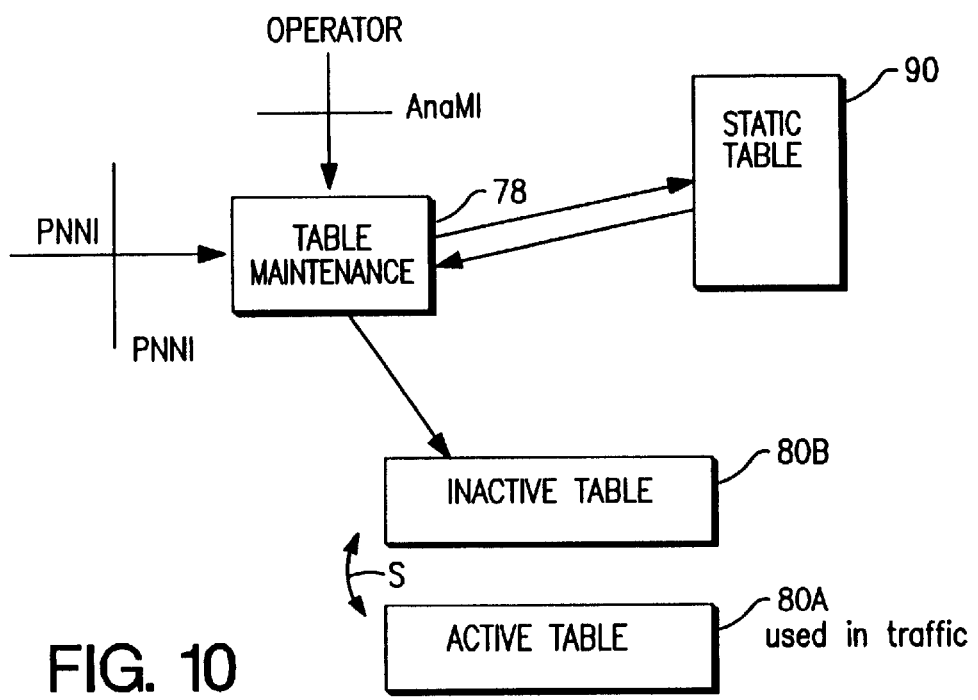
FIG. 10 is a diagrammatic view showing table maintenance logic of the node of FIG. 1 switching between an active table and an inactive table.

The table maintenance logic 78 of table handling unit 60 of the present invention provides for the consolidated active table 80, and allows for the table to be updated in two different ways. As diagrammatically depicted in FIG. 7, the table maintenance logic 78 of table handling unit 60 can receive updating input both from an operator (e.g., via workstation 98) and from the network via the PNNI protocol (e.g., in the form of a signal pnni_info from routing determination unit 56 [PNNIR]). As shown in FIG. 7, the operator's updating input is stored by table maintenance logic 78 in static table 90, while the PNNI updating input is stored by table maintenance logic 78 in inactive table 80B. Advantageously, table maintenance logic 78 merges the operator's updating input stored in static table 90 into inactive table 80B as indicated by arrow M. After the merging operation, the table containing the merging results (table 80B) is linked in to become the active table (table 80A), as represented by arrow L in FIG. 7.

As depicted in FIG. 7, via table maintenance logic 78 the operator can update one or more sections of static table 90, i.e., address analysis section 92, routing analysis section 94, or local look-up section 96. The static table 90 is then merged by table maintenance logic 78 with an inactive one of the consolidated tables (i.e., a copy of the active consolidated table maintained on a non-operational side of table handling unit 60).

When table maintenance logic 78 updates the address analysis section 82 of the active table 80A, a copy of the active table 80A is made on the non-operational side, e.g., inactive table 80B. Since the routing determination unit 56 [PNNIR] typically routinely obtains PNNI information about existing nodes in the network, table maintenance logic 78 uses such PNNI information to update the address analysis section 82 of inactive table 80B. Alternatively or additionally, address analysis section 82 can be updated when updating input is received from an operator and first stored in address analysis section 92, followed by merger of the data from address analysis section 92 into the address analysis section 82 of the inactive table 80B. The operator preferably specifies the address in ATM end system format, which is described in ATM User-Network Interface (UNI) Signalling Specification Version 4.0. By either updating mode (operator or PNNI), when a routing case is provided as a result, a verification is made by table maintenance logic 78 that the routing case is defined in routing analysis section 84.

The routing analysis section 84 of the active table can also be updated. As in the case of updating the address analysis section 82, a copy is made of the active table to form the inactive table 80B. The routing analysis section 84 is updated by the operator, with the updating information first stored in routing analysis section 94 of static table 90 and then merged with routing analysis section 84 of the inactive table 80B. Then, after merger, the updated information is included in the active table 80A. An operator is not allowed to remove a routing case that is used in address analysis section 82. Moreover, when a routing case is defined by the operator, a check is made by BICI/UNI to ensure that the route is defined.

Figure 8:
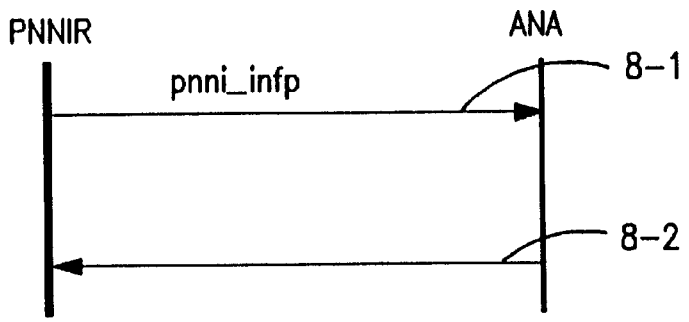
FIG. 8 is a diagrammatic view depicting messages involved the PNNI protocol updating of a consolidated table.
Figure 8A:
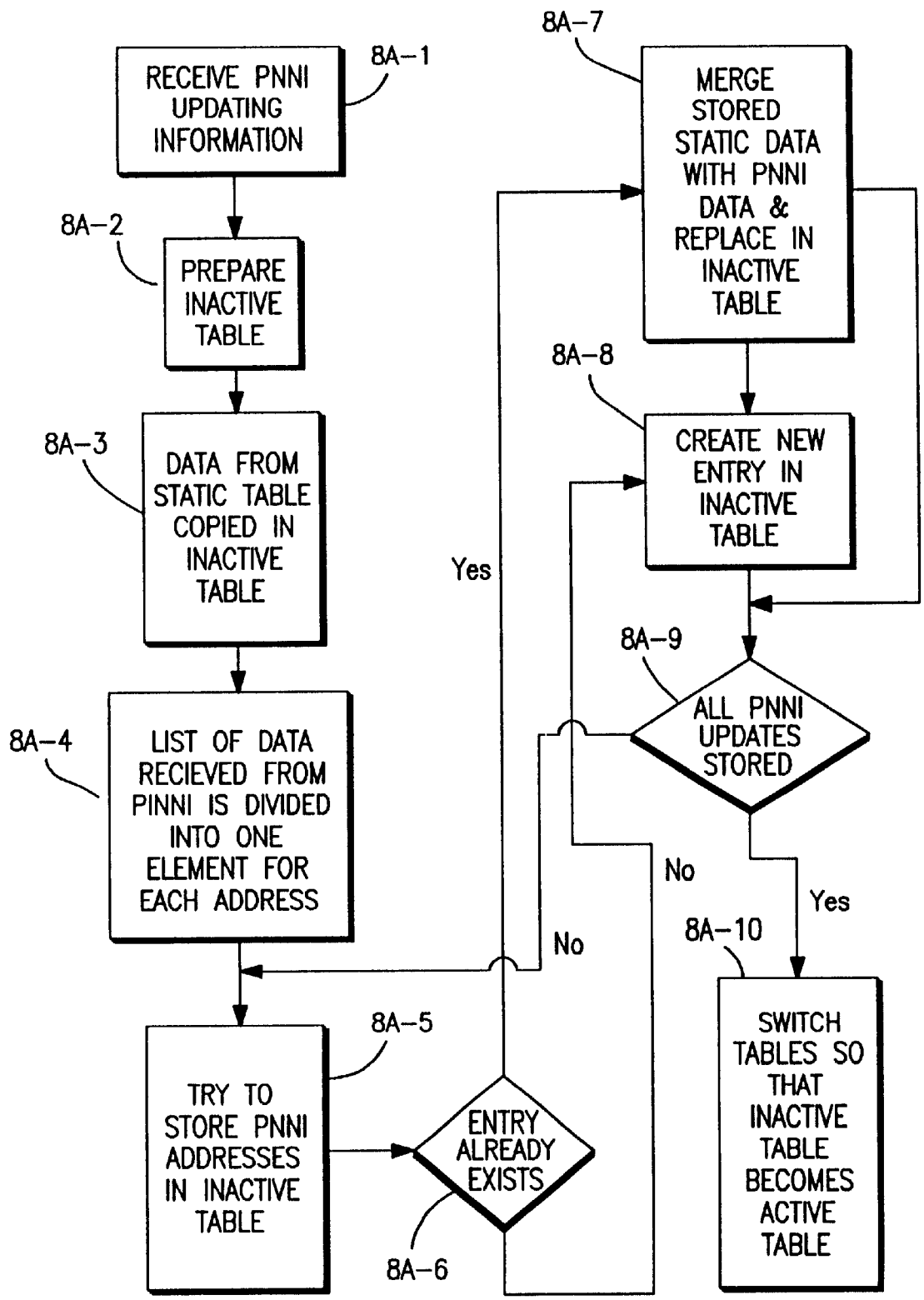
FIG. 8A is a flowchart showing actions taken by table maintenance logic in connection with the PNNI protocol updating of a consolidated table.

FIG. 8 together with FIG. 8A show updating of the active table 80A accomplished by the PNNI protocol, e.g., PNNI updating. FIG. 8A shows basic steps performed by table maintenance logic 78 upon receipt of the PNNI updating information indicated by message 8-1 (pnni_info) in FIG. 8. In FIG. 8, "ANA" refers to table handling unit 60; and "PNNIR" refers to routing determination unit 56. PNNI updating begins when table maintenance logic 78 receives PNNI updating information from routing determination unit 56 [PNNIR], as indicated by message 8-1 (pnni_info) in FIG. 8.

In particular, step 8A-1 shows table maintenance logic 78 receiving the PNNI updating information from routing determination unit (PNNIR) 56. The PNNI data obtained at step 8A-1 is in the form of a list which is included in the pnni_info signal, which signal contains all addresses that have been flooded out and the nodes to which they are connected. At step 8A-2, an inactive table 80B (see FIG. 11) is prepared on a non-operational side of table handling unit 60 by copying the current active table 80A. The active table 80A is on an operational side of table handling unit 60. As step 8A-3, all data in static table 90 is obtained by table maintenance logic 78 for and copied into the inactive table 80B.

At step 8A-4 The list of data received from PNNI at step 8A-1 is divided into one element for each address, i.e., one entry for each address. For example, for address "55" the element {55, A.1.3, A2} is prepared, the element having the values A.1.3 and A2 for its results field (see FIG. 2). Other comparable elements similarly understood with respect to FIG. 2 include {727, A.1.2, A2} and {400,A2}.

Step 8A-5 begins a loop, with step 8A-5 being an attempt to store the PNNI addresses and corresponding results fields in the inactive table 80B. The attempt of step 8A-5 may be determined at step 8A-6 to be unsuccessful because, for example, an entry may already exist in inactive table 80B corresponding to the information sought to be stored. If an entry already exists in inactive table 80B, at step 8A-7 the stored static data is merged with PNNI data for that entry, with the merged result being used as replacement for the corresponding entry in the inactive table 80B. If an entry does not yet exist, then at step 8A-8 a new entry is created in the inactive table 80B. Step 8A-5 is repeated for every address for which the PNNI has updating information, e.g., until all PNNI updates are processed as indicated by step 8A-9.

After all PNNI updates have been processed, at step 8A-10 the table maintenance logic 78 essentially switches tables by putting the inactive table 80B on the operational side and removing formerly active table 80A to the non-operational side (see FIG. 11). In other words, the table selector S in FIG. 1 is switched, and table 80B is linked to become the active table (see FIG. 7). Upon completion of PNNI updating, a signal 8-2 is sent from table handling unit 60 to routing determination unit 56 to confirm completion of the PNNI updating.

Figure 9:
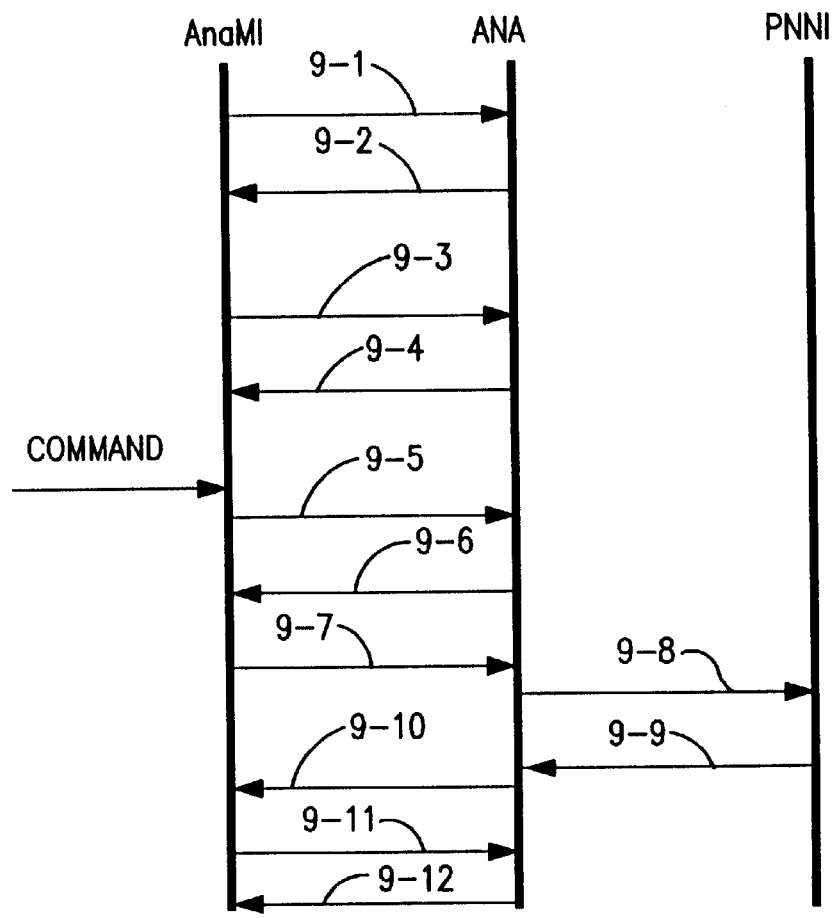
FIG. 9 is a diagrammatic view depicting messages involved in updating a consolidated table using operator input.

The foregoing discussion, with particular reference to FIG. 8 and FIG. 8A, describes the relative automatic PNNI updating. By contrast, FIG. 9 shows a procedure for an operator to update active table 80. In FIG. 9, "AnaMI" refers to an interface with the operator; "ANA" refers to table handling unit 60; and "PNNI" refers to the PNNI protocol implemented in routing determination unit 56 of ATM switching node 20.

In operator updating, the operator must first request update permission from table handling unit 60. To this end, FIG. 9 shows as message 9-1 a "GetLock" message from the operator for requesting such permission. Return message 9-2 shows operator being granted such permission. After permission is granted, the operator requests that a copy of static table 90 be made. Such request is depicted as the "Copy-Table" message 9-3 in FIG. 9. After the static table 90 is copied, a copy confirmation message 9-4 is issued to the operator.

With the static table 90 having been copied to serve as a workspace, the operator then issues a command message 9-5. The command message 9-5 can be any one of creating, deleting, or changing records in any one of the sections of static table 90 (e.g., address analysis section 92, routing analysis section 94, or local look-up section 96). Upon completion by table maintenance logic 78 of execution of the command, a command execution confirmation message 9-6 is returned to the operator. An entire series of such commands can be issued for plural updates to the static table 90. After the last updating command message is issued and execution thereof confirmed, the operator sends a switch message 9-7 to table maintenance logic 78.

Assuming that PNNI updates as described in FIG. 8 and FIG. 8A are also possible, table maintenance logic 78 requests PNNI data from routing determination unit 56

[PNNIR] by sending a poll-address message shown as message 9-8 in FIG. 9. In response to the poll-address message, routing determination unit 56 sends the pnni-info signal shown as message 9-9 in FIG. 9. The PNNI information is received by table maintenance logic 78. Then, the steps of FIG. 8A are performed by table maintenance logic 78, resulting in the merging of data from static table 90 with the PNNI data obtained from PNNIR.

Upon completion of the updating of FIG. 9, the operator receives message 9-10 confirming completion of the updating. As shown by message 9-11, the operator then can indicate that the operator is ready to release its lock on table maintenance logic 78. In response, a release indication is sent by table maintenance logic 78 to the operator as message 9-12.

The locking described in FIG. 9 serves to avoid updating interferences between different operators. As indicated, when an operator has finished the update, the operator must release the lock. However, an operator with higher authority can also release the lock.

If there turn out to be any problems with the newly-created active table after it is switched to the operational side, the previous table can be retrieved and utilized.

Advantageously, in the present invention only one table— the active table 80—need be searched when table handling unit 60 is forwarded a called party number or address by call control unit 54 in connection with connection setup. The table 80 which is used as the active table is updated by both the operator (e.g., via workstation 98) and by the network (e.g., via the PSTEs of the PNNI protocol).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claim is:

1. An ATM switching node which implements PNNI protocol, the node comprising:
   a PNNI protocol unit which uses a topology database to prepare PNNI updating information;
   a table which stores plural records, each record associating a connection request input field with corresponding routing information, wherein the table has an active version and an inactive version copied therefrom, wherein the active version of the table is utilized in connection setup;
   table maintenance logic which updates the table to consolidate therein both records initiated by operator input and records developed from the network signaling updating information; wherein updating is performed on the inactive version of the table, and wherein when updating is completed the inactive version of the table becomes the active version of the table.

2. The apparatus of claim 1, further comprising a topology cell handling unit which receives topology messages and builds a topology database for the node.

3. The apparatus of claim 1, further comprising a call control unit which, when a connection request is received, sends a called party number included in the connection request to a table handling unit, the table handling unit using the at least a portion of the called party number as the connection request input field for locating the corresponding routing information in the table.

4. The apparatus of claim 1, further comprising:
   a static table in which operator input information is stored for use in developing the records initiated by operator input; and
   wherein the operator input information stored in the static table and the PNNI updating information are merged in the inactive version of the table.

5. The apparatus of claim 1, further comprising a static table in which operator input information is stored for use in developing the records initiated by operator input.

6. The apparatus of claim 1, wherein the table has an address analysis section; a routing analysis section; and a local look-up section.

7. A method of operating an ATM switching node which implements PNNI protocol, the method comprising:
   receiving topology messages and building a topology database for the node;
   using the topology database to prepare PNNI updating information;
   consulting a table to obtain routing information associated with a corresponding connection request input field, the table having an active version and an inactive version copied therefrom;
   using the active version of the table in connection setup;
   updating the inactive version of the table by consolidating operator input information and the PNNI updating information; and
   when updating is completed, using the inactive version of the table as the active version of the table.

8. The method of claim 7, further comprising:
   when a connection request is received, using at least a portion of a called party number included in the connection request as the connection request input field for locating the corresponding routing information in the table.

9. The method of claim 7, further comprising:
   storing the operator input information in a static table; and
   merging the operator input information stored in the static table and the PNNI updating information in the inactive version of the table.

10. The method of claim 7, further comprising storing operator input information in a static table.

11. An ATM switching node which implements a network signaling protocol, the node comprising:
    a network signaling protocol unit which uses a topology database to prepare network signaling updating information;
    a table which stores plural records, each record associating a connection request input field with corresponding routing information, wherein the table has an active version and an inactive version copied therefrom, wherein the active version of the table is utilized in connection setup;
    table maintenance logic which updates the table to consolidate therein both records initiated by operator input and records developed from the network signaling updating information; wherein updating is performed on the inactive version of the table, and wherein when updating is completed the inactive version of the table becomes the active version of the table.

12. The apparatus of claim 11, further comprising a topology cell handling unit which receives topology messages and builds a topology database for the node.

13. The apparatus of claim 11, further comprising a call control unit which, when a connection request is received, sends a called party number included in the connection request to a table handling unit, the table handling unit using the at least a portion of the called party number as the connection request input field for locating the corresponding routing information in the table.

14. The apparatus of claim 11, further comprising:

a static table in which operator input information is stored for use in developing the records initiated by operator input; and wherein the operator input information stored in the static table and the network signaling updating information are merged in the inactive version of the table.

15. The apparatus of claim 11, further comprising a static table in which operator input information is stored for use in developing the records initiated by operator input.

16. The apparatus of claim 11, wherein the table has an address analysis section; a routing analysis section; and a local look-up section.

17. A method of operating an ATM switching node which implements a network signaling protocol, the method comprising:

receiving topology messages and building a topology database for the node;

using the topology database to prepare network signaling updating information;

consulting a table to obtain routing information associated with a corresponding connection request input field, the table having an active version and an inactive version copied therefrom;

using the active version of the table in connection setup;

updating the inactive version of the table by consolidating operator input information and the network signaling updating information; and when updating is completed, using the inactive version of the table as the active version of the table.

18. The method of claim 17, further comprising:

when a connection request is received, using at least a portion of a called party number included in the connection request as the connection request input field for locating the corresponding routing information in the table.

19. The method of claim 17, further comprising:

storing the operator input information in a static table; and merging the operator input information stored in the static table and the network signaling updating information in the inactive version of the table.

20. The method of claim 17, further comprising storing operator input information in a static table.

* * * * *